United States Patent
Brdiczka et al.

(10) Patent No.: US 8,117,054 B2
(45) Date of Patent: Feb. 14, 2012

(54) METHOD FOR ESTIMATING TASK STRESS FACTORS FROM TEMPORAL WORK PATTERNS

(75) Inventors: Oliver Brdiczka, Mountain View, CA (US); Norman Makato Su, Irvine, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 186 days.

(21) Appl. No.: 12/622,942

(22) Filed: Nov. 20, 2009

(65) Prior Publication Data

US 2011/0125547 A1    May 26, 2011

(51) Int. Cl.
*G06Q 10/00* (2006.01)
(52) U.S. Cl. .................................................. 705/7.11
(58) Field of Classification Search .................. 705/7.11
See application file for complete search history.

(56) References Cited

U.S. PATENT DOCUMENTS

| | | | | |
|---|---|---|---|---|
| 5,388,211 | A * | 2/1995 | Hornbuckle | 717/178 |
| 5,499,340 | A * | 3/1996 | Barritz | 714/47.1 |
| 5,675,510 | A * | 10/1997 | Coffey et al. | 709/224 |
| 5,687,291 | A * | 11/1997 | Smyth | 706/10 |
| 5,710,884 | A * | 1/1998 | Dedrick | 709/217 |
| 5,732,212 | A * | 3/1998 | Perholtz et al. | 709/224 |
| 5,796,952 | A * | 8/1998 | Davis et al. | 709/224 |
| 5,848,396 | A * | 12/1998 | Gerace | 705/7.33 |
| 6,018,619 | A * | 1/2000 | Allard et al. | 709/224 |
| 6,065,138 | A * | 5/2000 | Gould et al. | 714/47.2 |
| 6,092,058 | A * | 7/2000 | Smyth | 706/10 |
| 6,189,005 | B1 * | 2/2001 | Chakrabarti et al. | 1/1 |
| 6,295,509 | B1 * | 9/2001 | Driskell | 702/182 |
| 6,405,159 | B2 * | 6/2002 | Bushey et al. | 703/13 |
| 6,473,752 | B1 * | 10/2002 | Fleming, III | 707/708 |
| 6,662,158 | B1 * | 12/2003 | Hon et al. | 704/252 |
| 6,907,426 | B2 * | 6/2005 | Hellerstein et al. | 1/1 |
| 7,152,018 | B2 * | 12/2006 | Wicks | 702/186 |
| 7,285,090 | B2 * | 10/2007 | Stivoric et al. | 600/300 |
| 7,292,152 | B2 * | 11/2007 | Torkkola et al. | 340/576 |
| 7,428,449 | B2 * | 9/2008 | Fehr et al. | 701/1 |
| 2004/0133081 | A1 * | 7/2004 | Teller et al. | 600/300 |
| 2004/0252027 | A1 * | 12/2004 | Torkkola et al. | 340/576 |
| 2005/0183143 | A1 * | 8/2005 | Anderholm et al. | 726/22 |
| 2008/0222286 | A1 * | 9/2008 | Plumpton | 709/224 |
| 2010/0274744 | A1 * | 10/2010 | Brdiczka et al. | 706/12 |

OTHER PUBLICATIONS

Su, Norman Makoto, Temporal Patterns in the Workplace University of California Irvine, Dissertation, 2009.*
Brdiczka, Oliver et al., Using Temporal Patterns (T-Patterns) to Derive Stress Factors of Routine Tasks CHI 2009, Apr. 4-9, 2009.*
Begole, James (Boo) et al., Rhythm Modeling, Visualizations and Applications Proceedings of the 2003 Symposium on User Interface Software and Technology (UIST 2003), 2003.*

(Continued)

*Primary Examiner* — Scott L Jarrett
(74) *Attorney, Agent, or Firm* — Shun Yao; Park, Vaughan, Fleming & Dowler LLP

(57) ABSTRACT

One embodiment of the present invention provides a system for estimating a number of stress factors related to a worker. During operation, the system records a sequence of work steps of the worker for a predetermined period of time, and extracts a number of temporal patterns (T-patterns) from the sequence of work steps. Based on the extracted T-patterns, the system calculates T-pattern statistics, and applies a classification method on the calculated T-pattern statistics to produce a classification result. The system then estimates one or more of the stress factors based on the classification result.

15 Claims, 4 Drawing Sheets

OTHER PUBLICATIONS

Begole, James (Bo) et al., Rythims: Analyzing Visualizations of Awareness Histories of Distributed Groups CSCW'02, Nov. 16-20, 2002.*

Healey, Jennifer A. et al., Detecting Stress During Real-World Driving Tasks Using Phsicological Sensors HP, HPL-2004-229, Dec. 17, 2004.*

Kaber, David B. et al., Workload State Classification With Automation During Simulated Air Traffic Control the International Journal of Aviation Psychology, vol. 17, No. 4, 2007.*

Magnusson, Magnus S., Discovering hidden time patterns in behavior: T-patterns and their detection Behavior Research methods, Instruments and Computers, vol. 32, 2000.*

Shen, Jianqiang et al., A Hybrid Learning System for Recognizing user tasks from Desktop Acitivities and Email Messages IUT'06, Jan. 29-Feb. 1, 2006.*

NASA Task load Index (TLX) v1.0—Computerized Version Human Performance Research Group, NASA Ames Research Center, 2005.*

Barrett, Sam, Monitoring: Monitoring raises privacy issues Employee Benefits, May 2008.*

Grant, Rebecca A. et al., Computerized Performance Monitors as Multidimensional Systems: Derivation and Aplication ACM Transactions on Information Systems, vol. 14, No. 2 Apr. 1996.*

Wilson, Glenn F. et al., Performance Enhancement with Real-Time Physilogicall Controlled Adaptive Aiding ASC2000, Feb. 18, 2000.*

Dragunov, Anton N. et al., TaskTracer: A Desktop Environment to Support Multi-tasking Knowledge Workers IUI'05, Jan. 9-12, 2005, ACM.*

Begole, James Bo et al., Work Rythms: Analyzing Visualizations of Awareness Histories of Distributed Groups CSCW'02, Nov. 16-20, 2002.*

Brdiczka, Oliver et al., "Using Temporal Patterns (T-Patterns) to Derive Stress Factors of Routine Tasks", CHI 2009, Apr. 4-9, 2009, Boston, Massachusetts, ACM 978-1-60558-247-4/09/04.

* cited by examiner

METHOD FOR ESTIMATING TASK STRESS FACTORS FROM TEMPORAL WORK PATTERNS

BACKGROUND

1. Field

This disclosure is generally related to working environment monitoring. More specifically, this disclosure is related to estimating stress factors of a worker using temporal work patterns.

2. Related Art

Management of companies and task designers have been interested in measuring factors contributing to a worker's stress, including workload, autonomy, and productivity perceived by the worker. By acquiring worker-stress related information, a task or process designer can optimize the designed task or system. Such information becomes increasingly important due to the increased role of technology and the use of complex procedures.

Various techniques exist for assessing a worker's stress factors, among which the National Aeronautics and Space Administration-Task Load Index (NASA-TLX) scale test is one of the most widely used tools for workload assessment. The NASA-TLX is a multi-dimensional rating tool that is used to derive an overall workload rating based upon a weighted average of six workload sub-scale ratings. The NASA-TLX uses the following six sub-scales: mental demand, physical demand, temporal demand, effort, performance, and frustration level. Although software packages for NASA-TLX have been developed to automate most of the analysis procedure, there are still several drawbacks for implementing NASA-TLX.

Methods for administering a NASA-TLX scale test include observing the worker, interviewing the worker, and asking the worker to fill out a survey. Such processes can be tedious or cumbersome to the worker, especially if performed repeatedly. In addition, the NASA-TLX can be administered either on-line (while the worker is performing the task) or post-trial (after the task has been performed). When administered on-line, the TLX can be intrusive to task performance, whereas when administered post-trial, the worker may have forgotten high workload aspects of the task. Hence, it is desirable to provide a technique that can be used to estimate task stress on a worker without the aforementioned problems.

SUMMARY

One embodiment of the present invention provides a system for estimating a number of stress factors related to a worker. During operation, the system records a sequence of work steps of the worker for a predetermined period of time, and extracts a number of temporal patterns (T-patterns) from the sequence of work steps. Based on the extracted T-patterns, the system calculates T-pattern statistics, and applies a classification method on the calculated T-pattern statistics to produce a classification result. The system then estimates one or more of the stress factors based on the classification result.

In a variation on this embodiment, the T-pattern statistics include a minimum temporal length of one or more of the T-patterns and a variance of the minimum temporal length.

In a variation on this embodiment, recording the work steps includes recording the beginning and ending time of the work steps, and recording an artifact and/or communicative channel used by the worker to accomplish the work steps.

In a variation on this embodiment, the work steps include logging events on a computing device.

In a further variation, the logging events include one or more of: opening and/or closing an application, opening and/or closing a document, and accessing an email account.

In a variation on this embodiment, the classification method includes a supporting-vector-machine (SVM) method and applying a Bayesian classifier.

In a variation on this embodiment, the work steps of the worker are recorded using one or more of the following methods: running logging software installed on a computing device of the worker, monitoring the worker using a camera, and allowing a human observer to shadow the worker.

In a variation on this embodiment, the stress factors of the worker include at least one of: a work-load factor, an autonomy factor, and a productivity factor.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system for estimating a number of stress factors related to a worker. By extracting temporal patterns (T-patterns) from a series of work steps performed by the worker and applying a T-pattern analysis, the system can calculate T-pattern statistics for each task or for each workday. Using a classification method and example instances of perceived stress factors, the system can construct a classifier and use the constructed classifier to estimate the worker's level of stress.

Temporal Dimension of Work Routines

Many human-computer interaction (HCI) and computer-supported cooperative work (CSCW) researchers have been analyzing working routines, including temporal regularity (rhythm) and how awareness of rhythms can facilitate work. It has been shown that by examining past, recurring work rhythms, one can predict future presence based on current events (Begole, J. B., et al., 2002. Work Rhythms: Analyzing Visualizations of Awareness Histories of Distributed Groups. In *Proc. of CSCW'02*. 334-343). Other research includes: a study that uses the entropy (amount of randomness) of a person's location and Bluetooth® (registered trademark of the Bluetooth Special Interest Group (SIG) of Bellevue, Wash.) activity as a way to measure the variability and predictability of routines (Eagle, N. and Pentland, A. S., 2006. Reality Mining: Sensing Complex Social Systems. *Personal and Ubiquitous Computing* 10, 4 (May), 255-268); an ethnography study in a hospital showing how people use work rhythms to accomplish information seeking (Reddy, M. and Dourish, P., 2002. A finger on the Pulse: Temporal Rhythms and Information Seeking in Medical Work. In *Proc. of CSCW'02*. 344-353); and a study that analyzes the sequential variety of work (Pentland, B. T., 2003. Sequential Variety in Work Processes. *Organization Science* 14, 5, 528-540). Embodiments of the present invention analyze the temporal aspect of work routines and the psychological or organizational impacts of the work routines.

Figure 1:
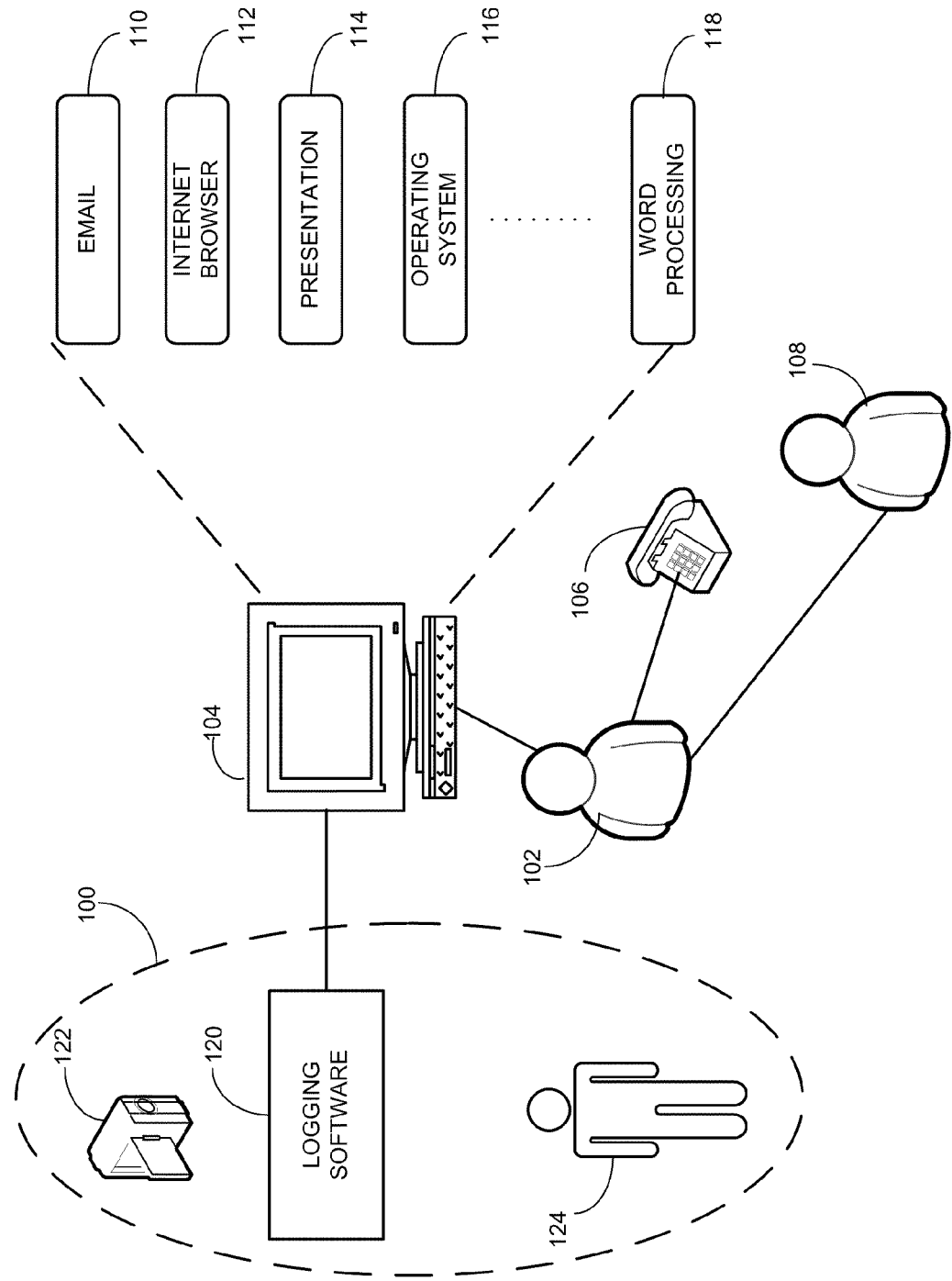
FIG. 1 presents a diagram illustrating a system that monitors a worker's activity in accordance with an embodiment of the present invention.

FIG. 1 presents a diagram illustrating a system that monitors a worker's activity in accordance with an embodiment of the present invention. Worker 102 performs routine office work that includes working on his desktop computer 104, talking on the telephone 106, and having a face-to-face conversation with another worker 108. While working on desktop computer 104, worker 102 may use different applications running on computer 104, including but not limited to: an email application 110, an Internet browser 112, a presentation application 114, an operating system application 116, and a word processing application 118. Monitoring system 100 includes logging software 120, and/or a video camera 122, and/or an observer 124.

Logging software 120 can be an application running in the background of worker 102's computer 104. Logging software 120 can monitor worker 102's computer use, such as running an application on computer 104 or opening and closing a window on computer 104. In one embodiment, logging software 120 records the starting and ending time and the application name of a computer-related activity. Note that, when more than one application is running on computer 104, logging software 120 keeps track of the switching of windows by worker 102. For example, worker 102 may open email application 110 and word processing application 118 simultaneously on computer 104. Each time worker 102 switches between the two windows (one for email application 110 and one for word processing application 118), logging software 120 timestamps the event. In addition to residing on worker 102's computer 104, in one embodiment, logging software 120 can also reside on a centralized server which is coupled to computer 104 via a wired or wireless network. In one embodiment, telephone 106 is coupled to computer 104, thus allowing logging software 120 to monitor worker 102's phone use.

Video camera 122 can be installed in worker 102's office in order to monitor worker 102's work activity, especially non-computer-related work activity. For example, video camera 122 can record face-to-face communications between worker 102 and worker 108. In one embodiment, video camera 122 also records images on the screen of computer 104, thus providing additional information associated with worker 102's computer use.

Another option for monitoring worker 102's activity is to include a human observer 124 in monitoring system 100. While worker 102 conducts his daily working activity, human observer 124 can stay close by to record (using a paper notepad or other record-keeping techniques) each and every work activity conducted by worker 102. In one embodiment, human observer 124 uses a paper notepad to record, to the second, the starting and ending time of worker 102's work activities, artifacts used, interactions, goals, and relevant quotes. When transcribed to a spreadsheet, each row represents the time spent on a single artifact or the communicative channel (hereinafter referred to as the medium) used to perform an activity. Hence, activities can be categorized as different media events based on the medium used. Examples of a media event include but are not limited to: having a face-to-face conversation (F2F); attending a meeting; using emails; using instant messages (IM); using a phone; Internet browsing; accessing the operating system (OS) of a computer; making presentation slides; using a spreadsheet; word processing; accessing a calendar; using office stationery; running miscellaneous applications, such as starting an MP3 player or playing video games; accessing hardware (i.e., printer or copy machine); and personal activities such as walking, snacking, or bathroom breaks.

The flexibility of human observer 124 makes it possible to record every single aspect of worker 102's work activity. For example, in addition to staying in the office of worker 102, observer 124 can also follow worker 102 to meetings at different locations. Note that using a human observer has been shown to be an effective technique for gathering data rich for qualitative and quantitative analysis.

Figure 2:
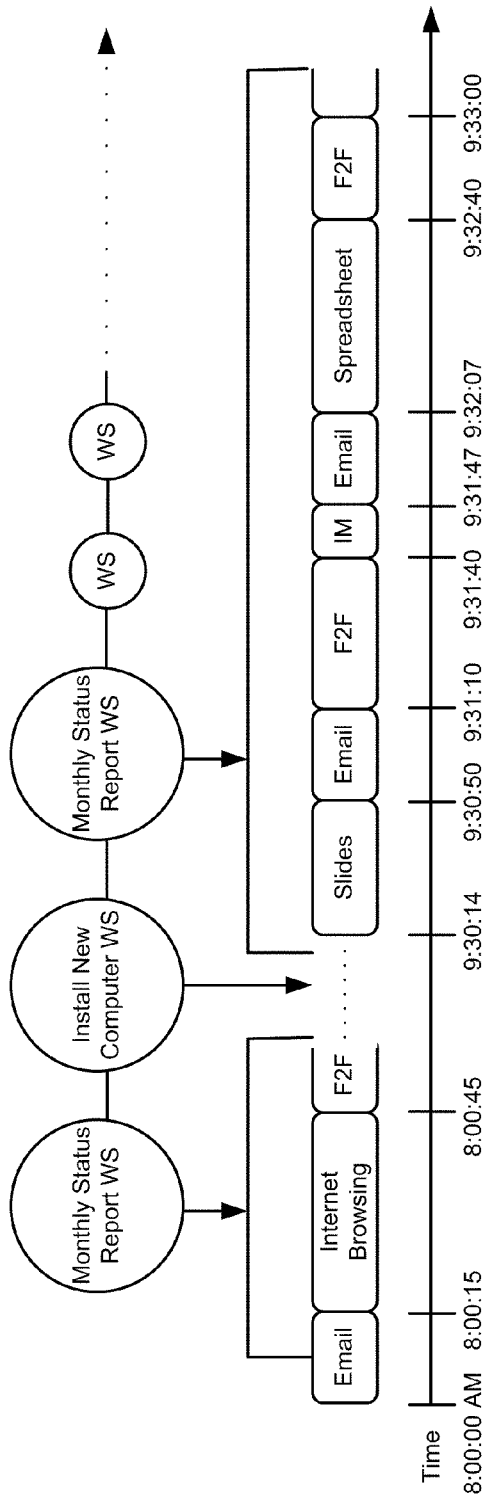
FIG. 2 presents a diagram illustrating an exemplary recorded temporal profile of work steps conducted by a worker in accordance with an embodiment of the present invention.

In order to find the routineness of events in the projects that people work on each day, the concept of the working sphere (WS) is introduced here. A WS is a "whole web of motives, people, resources, and tools that distinguishes it from other working spheres." A WS better conveys the notion that projects are not simply about office work, but are a set of interrelated events that share a common goal, involve communication with a particular set of people, use unique resources, and have their own time frame. In embodiments of the present invention, the temporal analysis of work routines is conducted on work steps belonging to the selected WS. FIG. 2 presents a diagram illustrating an exemplary recorded temporal profile of work steps conducted by a worker in accordance with an embodiment of the present invention. In a typical workday, a worker may perform various work activities (or media events) that can be organized into various WSs. In the example shown in FIG. 2, some media events belong to the Monthly Status Report WS, whereas some other activities belong to the Install New Computer WS. Note that the following T-pattern analyses are performed separately for each WS each day. When a WS is fragmented in a particular day (as shown in FIG. 2, the Monthly Status Report WS is fragmented into two parts), the T-pattern for the WS is analyzed by concatenating the WS fragments and then running T-pattern detection on the resulting combination of media events.

T-Pattern Analysis

Routine tasks can often be characterized by specific recurrent actions that are executed within nearly constant time intervals. A probabilistic temporal pattern detection method called T-pattern detection can be used to detect such patterns effectively. T-patterns are recurrent events that occur within a similar temporal configuration, or critical interval (CI). The T-patterns detection algorithm uses a CI test to ascertain whether certain temporal distances between all occurrences of two events are more likely to be random or not. The CI test is based on the null hypothesis that two events A and B are independently and purely randomly (Poisson) distributed over the observation period. The test is applied to all observed temporal distances between the two events A and B and their frequencies, identifying the distances that are supposedly not random according to a specified p-value. Beginning first by isolating all pairs of events that are random (the significant based patterns), the T-pattern algorithm then successively constructs larger patterns by combining events and the significant base patterns. In brief, T-pattern detection identifies highly significant, hierarchically arranged T-patterns that are composed of statistically related events that repeatedly appear in the same, relatively invariant, temporal configurations.

T-pattern analysis provides significant advantages over other traditional sequence analyses by incorporating time. While traditional sequential pattern mining techniques uncover frequently occurring ordered events or subsequences as patterns, temporal interval information of the patterns is often ignored. In some embodiments of the present invention, a number of parameters are used for a T-pattern detection algorithm. These parameters include but are not limited to: minimum occurrence, significant level, and maximum pattern length.

The minimum occurrence specifies a minimum number of times a pattern must occur in order to be included in the result. In one embodiment, the minimum occurrence is set at 2. The significant level specifies the probability that a given pattern would occur in a random (Poisson) distribution. In one embodiment, the significant level is set at 0.05. The maximum pattern length specifies a maximum number of actions or events that a pattern can be composed of in order to reduce the complexity of the algorithm and to filter only reasonable pattern sizes. In one embodiment, the maximum pattern length is set at 4.

Figure 3:
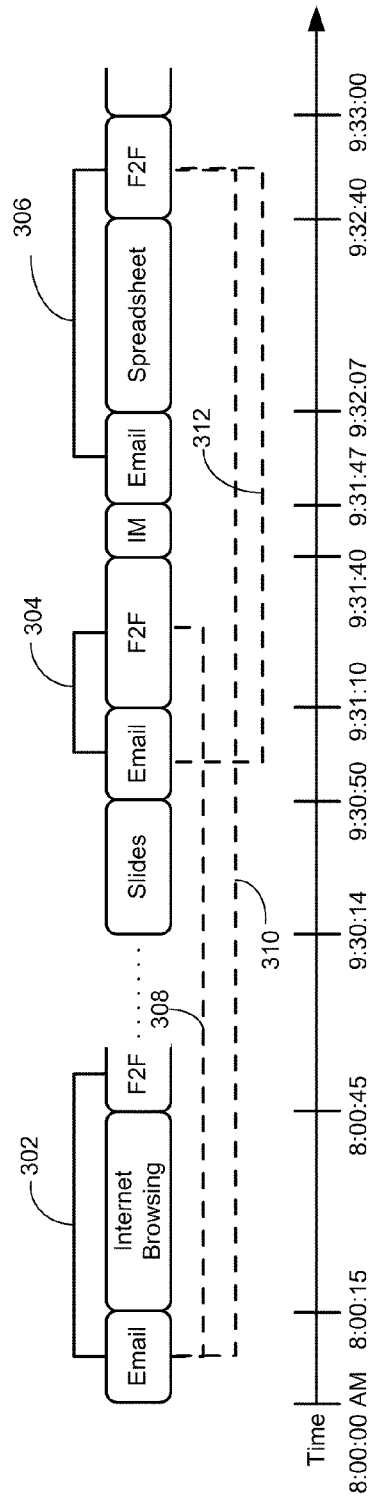
FIG. 3 presents a diagram illustrating an exemplary T-pattern detected by a T-pattern detection algorithm in accordance with an embodiment of the present invention.

FIG. 3 presents a diagram illustrating an exemplary T-pattern detected by a T-pattern detection algorithm in accordance with an embodiment of the present invention. For example, for the same media events, such as Email→F2F, a number of patterns, including patterns 302-312 are detected. T-patterns of the same media events can also be called a T-pattern class. Among detected T-patterns, some are significant T-patterns (such as T-patterns 302-306), and some are non-significant T-patterns (such as T-patterns 308-312).

Based on the recorded media events sequence (as the one shown in FIGS. 2 and 3), the T-pattern detection algorithm can identify a number of T-patterns ($N_T$) that are significant. In addition, the significant minimal and maximal temporal length for each T-pattern is reported. Note that the temporal length is defined as temporal distance between the two media events of a significant T-pattern. For example, if A is an earlier and B a later component of a significant T-pattern, and A occurs at time t while B occurs at time t+d, then the temporal distance of this significant pattern is d. If the T-pattern class A→B has a significant minimal temporal length of $d_1$ and a significant maximal temporal length of $d_2$, then after an occurrence of A at time t, there is an interval [t+$d_1$; t+$d_2$], ($d_2$>$d_1$>0) that contains at least one occurrence of B. In the example shown in FIG. 3, the temporal lengths of the 3 significant occurrences of pattern Email→F2F range from 20 seconds (pattern 304) to 53 seconds (pattern 306); thus $d_1$=20 and $d_2$=53. Note that the significant occurrences ($N_{sig}$) of the same T-pattern is a subset of all occurrences ($N_{total}$), including both significant and non-significant occurrences of the same pattern. In the example shown in FIG. 3, for T-pattern Email→F2F, $N_{sig}$=3 and 6.

Based on detected T-patterns and their properties, a number of T-pattern statistics can be calculated for each task or for each day. The calculated T-pattern statistics or metrics include, but are not limited to:

(1) $N_T$: number of classes (types) of T-patterns per WS. This measures the variety of media patterns utilized in a WS.

$$X_T = \frac{\sum_{t=1}^{N_T} N_{sig_t}}{N_T} : \quad (2)$$

average number of instances (occurrences) each T-pattern appears. This measures how often the same T-patterns are reused.

$$Ratio_T = \frac{\sum_{t=1}^{N_T} (N_{sig_t}/N_{total_t})}{N_T} : \quad (3)$$

ratio of significant instances of the T-patterns to the total number of instances of patterns with the same pattern. This measures the proportion of significant patterns (i.e., T-patterns) in a task or day.

$$D_T = \frac{\sum_{t=1}^{N_T} (d_{1_t} N_{sig_t})}{\sum_{t=1}^{N_T} N_{sig_t}} : \quad (4)$$

mean minimal temporal length ($d_1$) of T-patterns instances. This measure examines whether the task or day consists of T-patterns spread out over short or long intervals of time.

$$VarD_T = \frac{\sum_{t=1}^{N_T} (d_{1_t} - D_T)^2}{\left(\sum_{t=1}^{N_T} N_{sig_t}\right) - 1} : \quad (5)$$

variance of the minimum temporal length of T-pattern instances. This measure examines how variable the time between events in T-patterns is.

In one embodiment, the T-pattern analysis and a subsequent classification are implemented in Java™ (trademark of Sun Microsystems, Inc. of Santa Clara, Calif.) programming language. To find out the inherent relationship between T-pattern statistics and perceived stress factors, such as workload, autonomy, and productivity, in one embodiment a subjective test, such as a NASA TLX scale test is administrated, and a regression analysis is conducted. Workload is one's mental, physical, temporal, effort and frustration demands coupled with success in accomplishing task in a day; perceived productivity is one's efficiency plus the quality and quantity of work done in a day; and autonomy is the extent to which one has control and freedom in making judgments.

In one embodiment, a classification technique, such as support vector machine (SVM) or Bayesian classifier, is used in the regression analysis to discover the associations between temporal routines (or T-pattern statistics) and the worker's stress factors (including workload, productivity, and autonomy). Using training data collected from 10 employees over a three-day period, a number of relationships are reviewed between calculated T-pattern statistics and measured stress factors, including, but are not limited to:

(1) A significant relation in an increase in instances of T-patterns that are reused per WS per day with a decrease in amount of workload perceived.
(2) An increase in the proportions of a WS that is made up of T-patterns in a day is significantly related to an increase in autonomy.
(3) As the variability in the minimum T-pattern temporal distances increases in WSs in a day, perceived workload increases but autonomy decreases.
(4) A reduction in the number of T-pattern classes utilized per WS per day significantly decreases productivity.

In summary, the reuse of routine temporal patterns reduces stress, but that variability in the actual distance in events increases stress. In other words, workers who experienced a WS consisting of patterns whose temporal distance fluctuates perceive their day as having a greater workload. However, being able to reuse the same pattern over and over in a WS leads to a seemingly less stressful day.

In addition, routines can be productive. However, routines can reduce productivity if one starts employing a great number of different media patterns. Thus, just the mere utilization of a wide array of different media pattern classes, no matter whether each class is used a great deal or not, can make one's day seem less productive.

In terms of autonomy, workers experience an increase in their freedom to control how they work when the variance of temporal distances decreases in their WSs. This might indicate that people who are able to use a variety of media with relatively stable temporal durations (e.g., productivity software vs. interruptions from interactions) have more control over how they work.

Moreover, although variability of the minimum distance of the temporal patterns may affect working states, no evidence is found that the minimum distance of the temporal patterns affects working states.

Knowing the relationship between routines and working states makes it possible to use work routine measurements to estimate worker's stress factors. For example, using obtained training data including both T-pattern statistics and work state survey data (such as the NASA TLX scale test result), the system can construct a classifier. The constructed classifier can be used to estimate worker's stress factors in the future.

In addition, some embodiments uncover information associated with a worker's personality, such as extraversion and agreeableness, from T-pattern statistics of his work routine. Extraversion is one's degree of sociability and predilection for positive emotions, and agreeableness is one's degree of cooperation and empathy. In one embodiment, when collecting training data, the worker's personality traits are measured using the Big-5 scale. By conducting regression analysis on the training data, a relationship between a worker's work routineness and his personality can be revealed. Note that the regression analysis assumes that personality traits are inherent, not malleable factors affected by the environment. The relationships between work routine and worker's personality include, but are not limited to:

(1) A reduction in reuse of and proportion of T-patterns per WS per day is significantly related to increased extraversion.
(2) An increase in the temporal length of T-patterns per WS of a day is significantly related to increased extraversion and agreeableness.
(3) A reduction in the variability of the temporal length of T-patterns per WS of a day is significantly related to increased extraversion and agreeableness.

Figure 4:
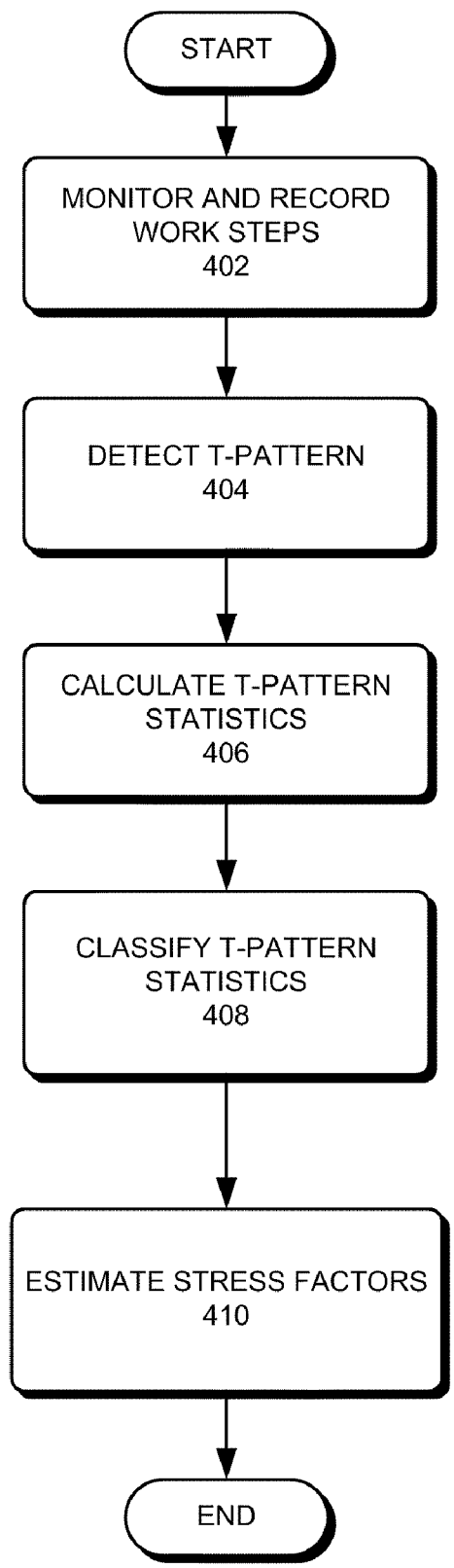
FIG. 4 presents a flow chart illustrating a process of estimating a worker's stress factor in accordance with an embodiment of the present invention.

FIG. 4 presents a flow chart illustrating a process of estimating a worker's stress factors in accordance with an embodiment of the present invention. During operation, the worker's work steps are monitored and recorded (operation 402). In one embodiment, logging software is installed in the worker's computer to record the worker's activity including the starting and ending times of a particular application on the computer. In one embodiment, a video camera is installed to record the worker's work steps. In a further embodiment, a human observer is used to record the worker's work steps. Based on the recorded work steps, the system extracts/detects a number of T-patterns for each WS (operation 404). In some embodiment, a number of predetermined parameters are used in the algorithm that detects T-patterns, including but not limited to: a minimum occurrence number that specifies the minimum occurrence of the pattern, a significance level that specifies the probability that a given pattern would occur in a random distribution, and a maximum pattern length that specifies the maximum number of events that a pattern can include.

Subsequently, the system calculates T-pattern statistics for extracted T-patterns (operation 406). In some embodiments, calculated T-pattern statistics include, but are not limited to: number of classes of T-patterns, average number of instances each T-pattern appears, ratio of significant instances of the T-patterns to the total number of instances of the patterns, mean minimum temporal length of T-pattern instances, and variance of the minimum temporal length of T-pattern instances. After obtaining the T-pattern statistics, a previously constructed classifier is used to classify the T-pattern statistics (operation 408). In one embodiment, an SVM method is used to classify the T-pattern statistics. In another embodiment, a Bayesian classifier is used to classify the T-pattern statistics. Based on the classification result, the system estimates factors associated with the worker's stress level (operation 410). Note that the detection of T-patterns, the calculation of the T-pattern statistics, and the classification of the T-pattern statistics can be conducted on the same computing device that records the worker's work steps, or they can be conducted on a separate server.

Figure 5:
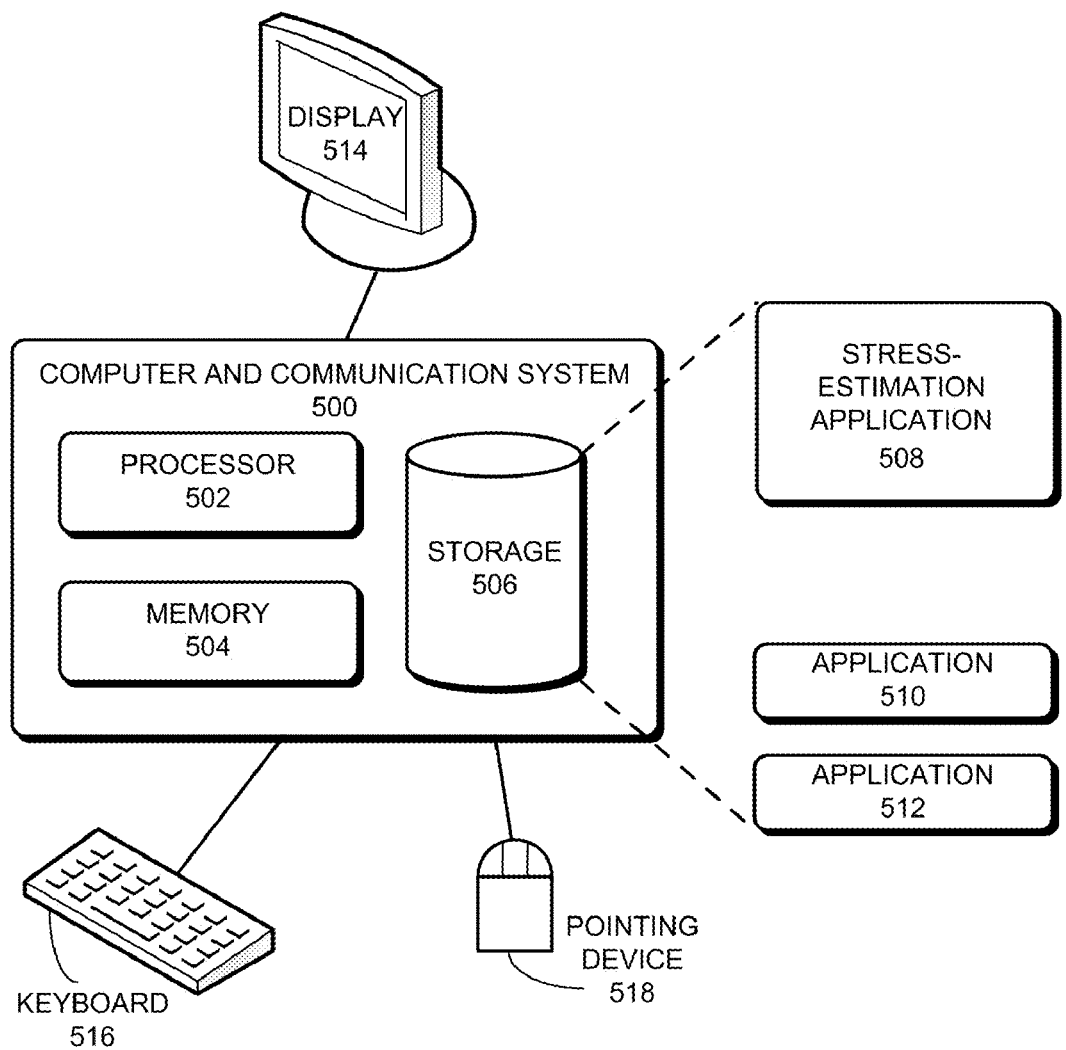
FIG. 5 illustrates an exemplary computer system for estimating stress factors in accordance with one embodiment of the present invention.

FIG. 5 illustrates an exemplary computer system for estimating stress factors in accordance with one embodiment of the present invention. In one embodiment, a computer and communication system 500 includes a processor 502, a memory 504, and a storage device 506. Storage device 506 stores a stress-estimation application 508, as well as other applications, such as applications 510 and 512. During operation, stress-estimation application 508 is loaded from storage device 506 into memory 504 and then executed by processor 502. While executing the program, processor 502 performs the aforementioned functions. Computer and communication system 500 is coupled to an optional display 514, keyboard 516, and pointing device 518.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for estimating a number of stress factors related to tasks of a worker, the method comprising:
 recording, by a computing device, a sequence of work steps of—performed on the computing device by the worker for a number of Working Spheres (WSs) over a predetermined period of time, wherein a respective WS is associated with tasks and projects of the worker and corresponds to one or more of motives, people, resources, and tools that distinguish the respective WS from other WSs;
 extracting a number of temporal patterns (T-patterns) associated with a first WS from the sequence of work steps;
 in response to the first WS being fragmented, wherein the fragmented WS is temporally scattered, retrieving T-patterns for the first WS in its entirety including all fragments by concatenating available WS fragments and running T-pattern analysis on the concatenation;
 calculating T-pattern statistics for the first WS, which comprises at least one of: a minimum temporal length of the T-patterns, and a variance of the minimum temporal length;
 applying a classification method on the calculated T-pattern statistics for the first WS to produce a classification result; and
 estimating one or more of the stress factors based on the classification result, wherein the stress factors of the worker comprise at least one of: a work-load factor; an autonomy factor; and a productivity factor.

2. The method of claim 1, wherein recording the work steps comprises:
 recording the beginning and ending times of the work steps; and
 recording an artifact and/or communicative channel used by the worker to accomplish the work steps.

3. The method of claim 1, wherein the work steps comprise one or more of:
 opening and/or closing an application;
 opening and/or closing a document; and
 accessing an email account.

4. The method of claim 1, wherein the classification method comprises at least one of:
 using a supporting-vector-machine (SVM) method; and
 applying a Bayesian classifier.

5. The method of claim 1, wherein the work steps are recorded using one or more of the following methods:

running logging software installed on a computing device of the worker; and
 monitoring the worker using a camera.

6. A non-transitory computer-readable storage medium storing instructions that when executed by a computer cause the computer to perform a method for estimating a number of stress factors related to a worker, the method comprising:
 recording a sequence of work steps of performed on a computing device by the worker for a number of Working Spheres (WSs) over a predetermined period of time, wherein a respective WS is associated with tasks and projects of the worker and corresponds to one or more of motives, people, resources, and tools that distinguish the respective WS from other WSs;
 extracting a number of temporal patterns (T-patterns) associated with a first WS from the sequence of work steps;
 in response to the first WS being fragmented, wherein the fragmented WS is temporally scattered, retrieving T-patterns for the first WS in its entirety including all fragments by concatenating available WS fragments and running T-pattern analysis on the concatenation;
 calculating T-pattern statistics for the first WS, which comprises at least one of: a minimum temporal length of the T-patterns, and a variance of the minimum temporal length;
 applying a classification method on the calculated T-pattern statistics for the first WS to produce a classification result; and
 estimating one or more of the stress factors based on the classification result, wherein the stress factors of the worker comprise at least one of: a work-load factor; an autonomy factor; and a productivity factor.

7. The computer-readable storage medium of claim 6, wherein recording the work steps comprises:
 recording the beginning and ending times of the work steps; and
 recording an artifact and/or communicative channel used to accomplish the work steps.

8. The computer-readable storage medium of claim 6, wherein the work steps comprise one or more of:
 opening and/or closing an application;
 opening and/or closing a document; and
 accessing an email account.

9. The computer-readable storage medium of claim 6, wherein the classification method comprises at least one of:
 using a supporting-vector-machine (SVM) method; and
 applying a Bayesian classifier.

10. The computer-readable storage medium of claim 6, wherein the work steps are recorded using one or more of the following methods:
 running logging software installed on a computing device of the worker; and
 monitoring the worker using a camera.

11. A system for estimating a number of stress factors related to a worker, the system comprising:
 a recording mechanism on a computing device configured to record a sequence of work steps performed on the computing device by the worker for a number of Working Spheres (WSs) over a predetermined period of time, wherein a respective WS is associated with tasks and projects of the worker and corresponds to one or more of motives, people, resources, and tools that distinguish the respective WS from other WSs;
 an extraction mechanism configured to extract a number of temporal patterns (T-patterns) associated with a first WS from the sequence of work steps;

an aggregation mechanism configured to respond to the first WS being fragmented, wherein the fragmented WS is temporally scattered, by retrieving T-patterns for the first WS in its entirety including all fragments by concatenating available WS fragments and running T-pattern analysis on the concatenation;

a calculation mechanism configured to calculate T-pattern statistics for the first WS, which comprises at least one of: a minimum temporal length of the T-patterns, and a variance of the minimum temporal length;

a classification mechanism configured to apply a classification method on calculated T-pattern statistics for the first WS to produce a classification result; and an estimation mechanism configured to estimate one or more of the stress factors based on the classification result, wherein the stress factors of the worker comprise at least one of: a work-load factor; an autonomy factor; and a productivity factor.

12. The system of claim 11, wherein the recording mechanism is configured to:

record the beginning and ending times of the work steps; and record an artifact and/or communicative channel used to accomplish the work steps.

13. The system of claim 11, wherein the work steps comprise one or more of:

opening and/or closing an application;

opening and/or closing a document; and accessing an email account.

14. The system of claim 11, wherein the classification method comprises at least one of:

using a supporting-vector-machine (SVM) method; and applying a Bayesian classifier.

15. The system of claim 11, wherein the work steps are recorded using one or more of the following methods:

running software installed on a computing device of the worker; and monitoring the worker using a camera.

* * * * *